United States Patent [19]

Raudys

[11] Patent Number: 4,621,392
[45] Date of Patent: Nov. 11, 1986

[54] STUFFING APPARATUS AND METHOD

[75] Inventor: Vytas A. Raudys, Chicago, Ill.

[73] Assignee: Viskase Corporation, Chicago, Ill.

[21] Appl. No.: 732,598

[22] Filed: May 10, 1985

[51] Int. Cl.$^4$ ............................................. A22C 11/50
[52] U.S. Cl. ........................................ 17/49; 17/1 R; 17/33; 17/41
[58] Field of Search ............... 17/1 R, 33, 35, 41, 17/42, 49; 426/105

[56] References Cited

U.S. PATENT DOCUMENTS 4,466,984  8/1984  Kupcikevicius ................ 426/105
4,525,895  7/1985  Raudys ............................ 17/1 R
4,551,884  11/1985  Kupcikevicius et al. ........ 17/49

Primary Examiner—Willie G. Abercrombie
Attorney, Agent, or Firm—Roger Aceto

[57] ABSTRACT

A stuffing apparatus and method for producing flat ended encased products using flat annular discs which are releasably joined together in pairs, wherein during the stuffing operation the discs are wraped to facilitate the separation of the discs so they may be individually passed over the stuffing tube and introduced into the casing to form the flat leading and trailing ends of the encased product.

15 Claims, 7 Drawing Figures

STUFFING APPARATUS AND METHOD

BACKGROUND

The present invention relates generally to a stuffing method and apparatus for producing encased food products having substantially flat ends which are defined by discs disposed within the casing. In particular, the present invention relates to a method and apparatus which insures that the discs, which are releasably joined together prior to their insertion into the casing, are easily separable so that the discs can be selectively introduced into the stuffed casing during the stuffing cycle to form the flat terminal ends of the encased product.

U.S. Pat. No. 4,466,465 describes a casing article for use in making, on a continuous basis, flat ended stuffed casing products having generally the shape of a right circular cylinder. For this purpose, the discs are annular. However, it should be appreciated that other disc shapes are possible, such as oval or polygonal. A companion patent, U.S. Pat. No. 4,466,984 describes a joined pair of discs which are disposable coaxially about a stuffing tube and inside an unshirred portion of the casing to be stuffed. The joined discs, separated during stuffing, are passed over the discharge of the stuffing horn and into the stuffed casing to form the flat ends of the product. An apparatus using the discs of U.S. Pat. No. 4,466,984 and the casing article of U.S. Pat. No. 4,466,465 is generally described in these patents and in a co-pending application, Ser. No. 675,478. The disclosures of the aforementioned patents and patent application are incorporated herein by reference.

Briefly, the pair of annular discs are juxtaposed and are joined together by a mechanical connection, such as a snap fit, which holds the discs in a face-to-face relationship. The discs are slightly spaced apart so that when they are in a proper position proximate to the discharge end of the stuffing horn, the stuffing pressure at the start of the stuffing operation will build up pressure between the discs and cause them to separate cleanly. One disc of the pair moves forward with the casing being stuffed so as to form the flat leading end of the stuffed casing. The trailing disc of the pair remains in position on the stuffing horn until the desired length of casing is stuffed. This trailing disc subsequently is moved off of the horn and into the stuffed casing at the end of the stuffing operation to form the flat trailing end of the stuffed casing, thereby forming the flat ended encased product.

The problem is that, at times, the discs may not separate cleanly responsive to the stuffing pressure. One reason for this is that manufacturing tolerances are such that the snap fit of one pair of discs may be tighter than the snap fit of another. Other attachment means can be used, such as an adhesive or break away means. However, the separation of these alternate means also may be difficult to control, and care is needed in order to insure a clean and even separation within a desired range of stuffing pressures. Separation is also hindered when the product being stuffed has a chunky consistency with a minimum of liquid or emulsion component. With such products the flow of liquid or emulsion into the space between the discs may be insufficient to cause the proper separation.

When the discs fail to separate, the stuffing pressure may push the connected pair forward and away from the stuffing tube so that both discs will be at the same end of the encased product. Consequently, the product will have only one flat end. Also, when both discs are pushed forward of the stuffing tube, the food product can back flow around and over the stuffing tube. This requires a shutdown for cleaning and thereby disrupts the stuffing cycle. If the discs separate but the separation is not clean and even around the entire periphery of the discs, the leading disc may tilt with respect to the stuffing axis. This would cause one end of the encased product to have an end which is not perpendicular to the longitudinal axis of the product. In this case the product will not be the shape of a right circular cylinder.

Accordingly, an object of the present invention is to provide means for insuring the proper separation of the joined pair of discs. This is accomplished according to the present invention by bending or warping the generally flat discs, which weakens the connection and causes separation of the discs or facilitates the subsequent separation of the discs responsive to a minimal stuffing pressure. The discs are fairly resilient so that when the warping forces are released, the disks return to their substantially flat orientation. In a preferred embodiment, warping or bending the discs, with respect to the generally flat plane of the discs, is accomplished by directing opposing members against each disc at staggered spaced intervals about the disc periphery.

SUMMARY OF THE INVENTION

The apparatus of the present invention has a stuffing axis along which is arranged a stuffing tube for stuffing a food product into casing drawn from a casing supply disposed about the tube and is characterized by:

(a) positioning means for engaging and moving in a forward direction along said stuffing tube to a preset position proximate the discharge end thereof, a pair of annular discs which are disposed coaxially on said stuffing tube and are arranged face to face within the casing and which have connector means releasably joining them with their adjacent inwardly facing surfaces in close proximity, the releasably joined pair of discs including a leading disc and a trailing disc which follows the leading disc in the direction of movement, and upon reaching said preset position, said leading and trailing discs being situated with respect to said discharge end such that stuffing will cause a pressure build up between said discs;

(b) retractable pressing means operable prior to stuffing to press against the joined discs with sufficient force to distort said discs and thereafter to retract from said discs, said discs being sufficiently distortable by said pressing means to weaken the connector means for separation of said discs responsive to a build up of pressure between them; and (c) means for holding said trailing disc at said preset position while leaving said leading disc free to move forward and longitudinally away from said discharge end responsive to the stuffing of a food product under pressure into the casing.

The method of the present invention is characterized by the steps of:

(a) providing leading and trailing annular discs arranged face-to-face with their adjacent inwardly facing surfaces in close proximity and releasably connected, and coaxially disposing said discs on a stuffing tube and within a casing supply also coaxially disposed on said stuffing tube;

(b) moving said annular discs forwardly along said stuffing tube, and positioning said discs at a preset location proximate the stuffing tube discharge end;

(c) while said joined discs are at said preset location, applying a pressing force against them and warping at least one of said discs relative to the plane of the connection between said discs, thereby weakening the connection for subsequent separation of the discs, and then removing said pressing force; and thereafter;

(d) stuffing a food product under pressure into casing drawn forwardly from said casing supply; and during step (d)

(e) holding said trailing disc at said preset location and leaving said leading disc free to separate from said trailing disc while passing said casing coaxially over said trailing disc and separating said leading disc from said trailing disc, and moving said leading disc longitudinally away from said stuffing tube discharge end responsive to said food product entering and stuffing said casing.

DESCRIPTION OF THE PREFERRED EMBODIMENT

The drawings show portions of various components of a stuffing machine as further described hereinbelow. It should be appreciated that these components are represented in schematic form because the structure and function of the components are well known in the art. Those components which are new and which are needed for practicing the present invention are also shown generally in schematic form. This is done to simplify the description and will not detract from an understanding of the structure and function of the invention by those skilled in the art.

From the figures, it should be appreciated that the stuffing machine defines a longitudinally extended stuffing axis 12. Disposed along the axis is a stuffing tube indicated at 14. The tube can either be the stuffing horn of the machine, or a sleeve or other similar member slipped over the stuffing horn. Accordingly, its representation in the figures as the stuffing horn is for purposes of illustration only.

Figure 1:
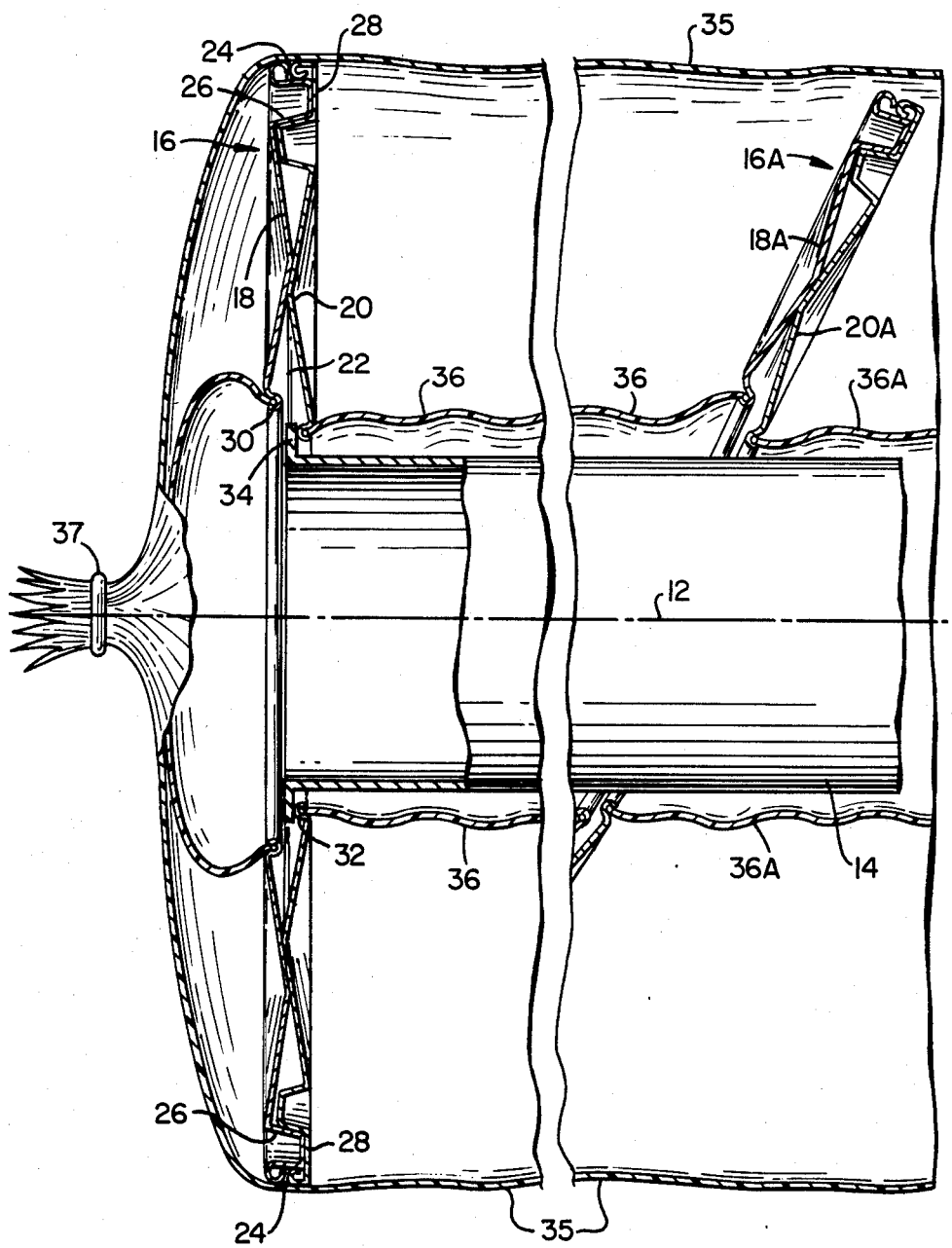
FIG. 1 shows a disc pair in position prior to stuffing the casing.

FIG. 1 shows a pair of annular extender discs, generally indicated at 16, disposed at a preset position proximate the discharge end of stuffing tube 14. These discs are more particularly described in U.S. Pat. No. 4,466,984. It is sufficient for the present invention merely to say that the pair of discs 16 includes a leading disc 18 and a trailing disc 20. The discs are juxtaposed and define a space 22 therebetween. Moreover, the two discs are releasably connected along a plane between the discs, preferably adjacent the periphery of the discs. The connection, as shown at 24 in FIG. 1, is a snap fit wherein a male component 26 on one disc fits into a female component 28 on the other.

Other figures show this connection 24 in schematic form to represent any suitable means for the releasable connection. For example, the aforesaid U.S. Pat. No. 4,466,984 describes in detail the preferred mechanical connection formed by components of the discs which snap fit together at spaced points about the periphery of the discs. It also mentions that other suitable means, such as an appropriate adhesive or breakaway means, also could function as the connector means for the discs.

The discs, being annular, each have a central opening. The opening 30 in the leading disc is larger in diameter than the corresponding opening 32 in the trailing disc. This allows the leading disc to situate at a preset position just forward of the stuffing tube discharge while the trailing disc is held at the stuffing tube discharge by a flange 34.

Trailing disc 20 is connected by a tubular membrane 36 to the leading disc 18A of a second disc pair 16A. In this fashion, a plurality of disc pairs can be joined together.

Disc pair 16 at the preset position is substantially perpendicular to the stuffing axis 12. Other disc pairs, as represented by pair 16A, are spaced back from the discharge of stuffing tube 14 and are inclined with respect to the stuffing axis. All the pairs are coaxially disposed about the stuffing tube which extends generally through the central opening in each disc. Also disposed coaxially about the stuffing tube is a casing 35. The casing is drawn from a supply (not shown) disposed on the stuffing tube, is pulled forward coaxially about the discs, and is clipped closed in front of the stuffing tube discharge end by a conventional clip enclosure 37.

During stuffing, it is intended that the food product be passed under pressure through the stuffing tube and into the casing. Because leading disc 18 is situated forward of the stuffing tube discharge end, the space 22 between the discs is pressurized by the emulsion or liquid component of the food product entering the space. This build-up of pressure should cause the two discs 18 and 20 to separate. The leading disc 18 is moved forward by food product entering the casing while the trailing disc 20 is prevented from moving forward from the preset position by flange 34. In this fashion, leading disc 18 will form the flat leading end of the stuffed product. At the end of the stuffing cycle, means (not shown in FIG. 1) will push and force the trailing disc 20 in a forward direction over flange 34 so that the casing can be gathered and closed behind the trailing disc. In this fashion, the trailing disc 20 forms the flat trailing end of the stuffed product. Either flange 34 or the inner periphery of disc 20 is made sufficiently flexible to permit the disc to be forced over the flange.

As the trailing disc 20 moves forward, membrane 36 pulls the succeeding disc pair 16A towards the preset position at the discharge of the stuffing horn. In this fashion, a succession of disc pairs can be moved one after the other into the set position for making the encased product with flat leading and trailing ends.

Figure 2:
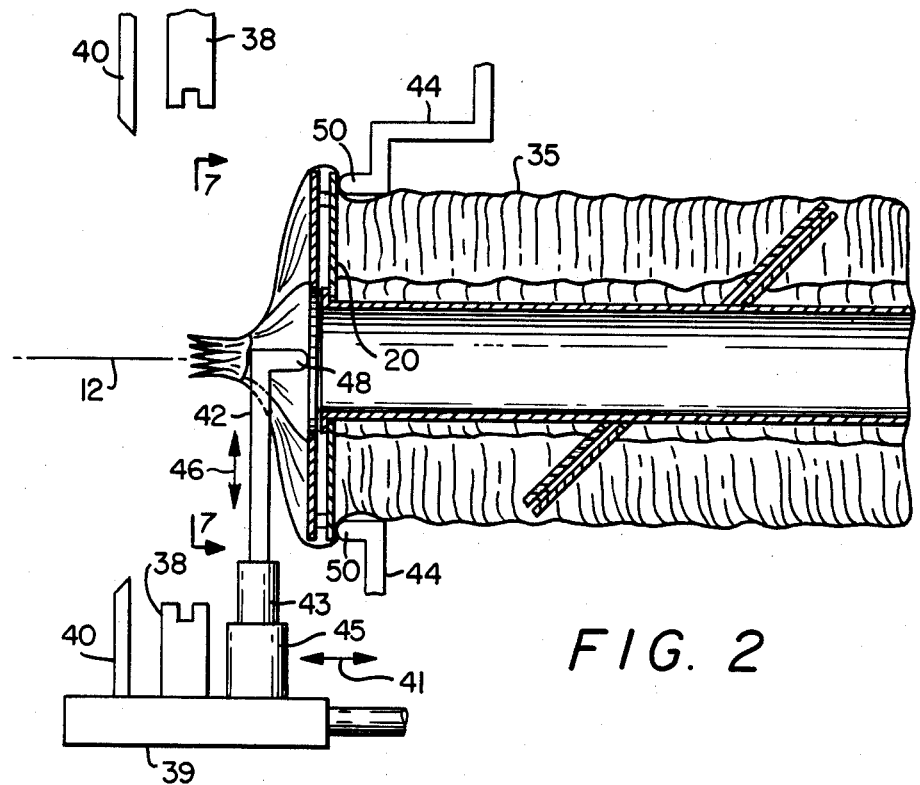
FIGS. 2-6 are views on a smaller scale showing steps in the operating sequence of the stuffing apparatus incorporating the present invention.

FIG. 2 shows the components of the stuffing machine, including a conventional clipper and severing mechanism 38. This mechanism is mounted on a carriage 39 that travels along a path parallel to the stuffing axis 12, as shown by arrow 41. The clipper and severing mechanism 38 can close in a conventional manner to gather, clip-close and sever the casing 35. Other components of the stuffing apparatus include a split emulsion sealing ring 40, a stop block 42 and a disc pair escorting and positioning means 44. These components are all capable of movement parallel to the stuffing axis 12 and can be carried by the clipper carriage 39.

Figure 3:
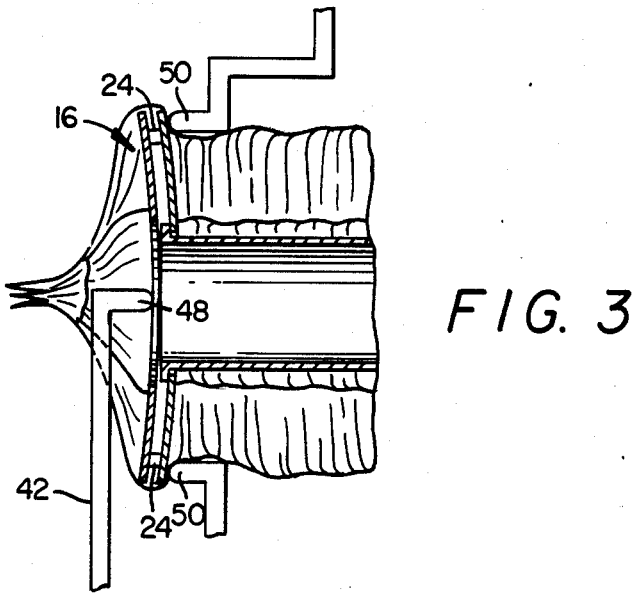
Figure 4:
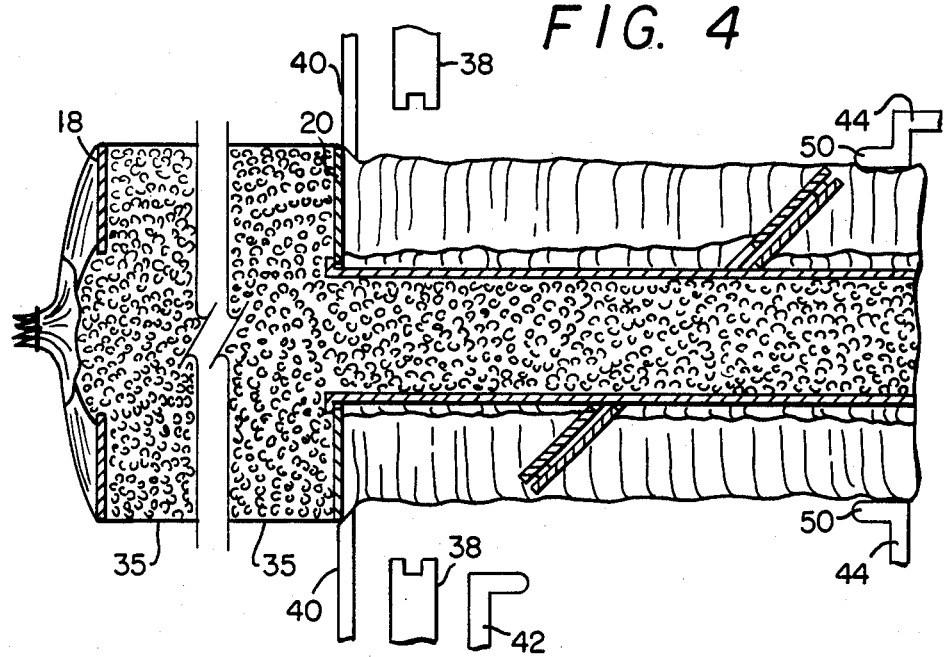
Figure 5:
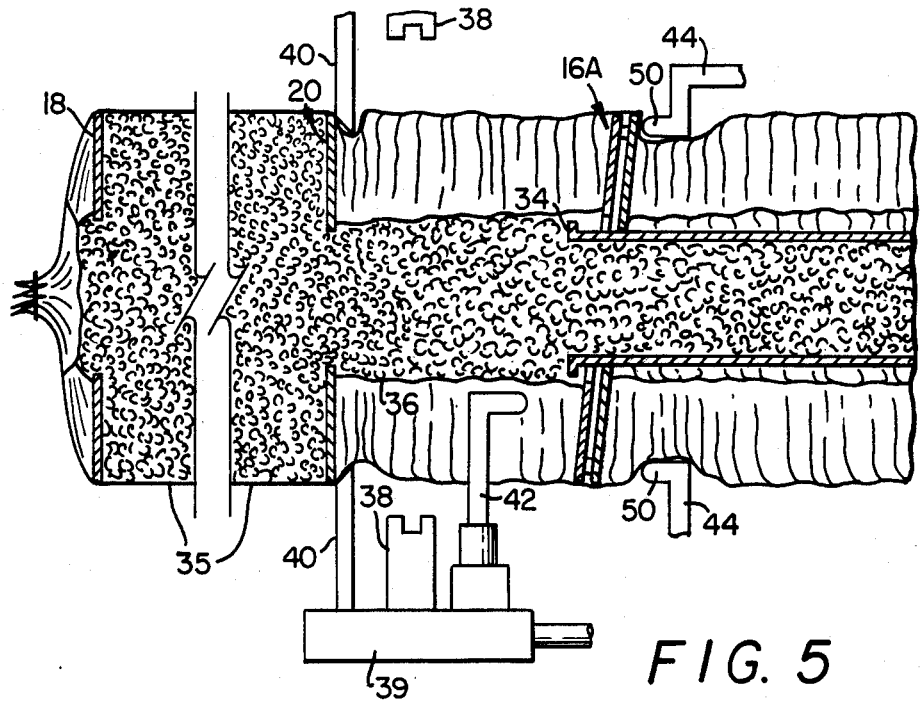

Stop block 42 also is mounted on a slide 43 arranged for movement in a plane transverse to stuffing axis 12 as indicated by arrow 46. Any suitable drive means such as a pneumatic cylinder 45 can be used to extend to stop block 42. FIGS. 2, 3, 6 and 7 show the stop block 42 in its fully extended position. FIG. 5 shows the stop block 42 in a partly retracted position and FIG. 4 shows the stop block 42 in its fully retracted position. As best seen in FIG. 7, the stop block 42 is formed by two legs 42A and 42B which define a generally U-shape. At the end of each leg is a projection 48. When the stop block 42 is fully extended, the projections 48 are in a position to bear against the outboard or forwarding facing surface of leading disc 18 at points adjacent the periphery of the disc. As shown in FIG. 7, these points are generally at the 3 o'clock and 9 o'clock positions.

The escorting and positioning means 44 also is generally U-shaped (FIG. 7) and it also has two projections 50. These projections 50 engage against the outboard or rearwardly facing surface of the trailing disc 20 (FIG. 2) at two points adjacent the disc periphery. These points are generally at the 12 o'clock and 6 o'clock positions (FIG. 7) or approximately 90° displaced from the contact positions of the projections 48 on stop block 42.

With this arrangement, a slight forward movement of the escorting and positioning means 44 parallel to the stuffing axis will cause the disc pair 16 to bend about the stop block projections 48. As shown in FIG. 3, this bending warps the disc pair with respect to the plane of the connection between the discs as defined by the connector means 24. It has been found that this bending and warping action is sufficient to substantially reduce the connection force, or even to cause complete separation of the discs. In any event, the connecting force is sufficiently reduced by the warping action to insure that the discs will separate cleanly responsive to a minimum stuffing pressure.

After the disc pair has been warped, stop block 42 is retracted downward out of the path of travel of the discs along the stuffing axis and the escorting and positioning means 44 is retracted rearward. Clipper carriage 39 moves in a backward direction until the split emulsion ring 40 is located just behind trailing disc 20. The split emulsion ring 40 closes about the trailing disc 20 as shown in FIG. 4. This snugs the casing to the periphery of the trailing disc 20 and provides an emulsion seal to prevent emulsion from back flowing around the trailing disc. The closing of the split emulsion ring about the trailing disc also helps to keep the trailing disc at the preset position, and it prevents the trailing disc from moving backwards along the stuffing tube responsive to the stuffing pressure in front of the trailing disc 20.

Foodstuff introduced under pressure into the casing causes the discs 18, 20 to separate as fluid enters the space between the discs, and both the casing and the leading disc 18 then move forward as the casing is stuffed (FIG. 4). Stuffing proceeds in this manner until the appropriate length of casing has been stuffed. During stuffing, it should be appreciated that the casing is drawn over and coaxially about the trailing disc, and that it passes between the trailing disc 20 and the emulsion seal 40.

When a preselected length of casing has been stuffed, the stuffing cycle is terminated and the clipper carriage 39 is indexed forward. As the clipper carriage 39 advances along the stuffing axis, the closed split emulsion seal ring 40 forces the trailing disc 20 off of the stuffing horn as shown in FIG. 5. As mentioned hereinabove, the flange 34 and/or the inner periphery of the disc 20 is sufficiently flexible to allow the disc to pass over the flange under an axial loading condition.

The forward motion of the trailing disc 20 pulls on the next pair of discs 16A, to which it is attached by tubular membrane 36. The disc pair 16A is pulled axially along the stuffing horn to a position where the disc pair can be engaged and escorted to the preset stuffing position by the escorting and positioning means 44.

Figure 6:
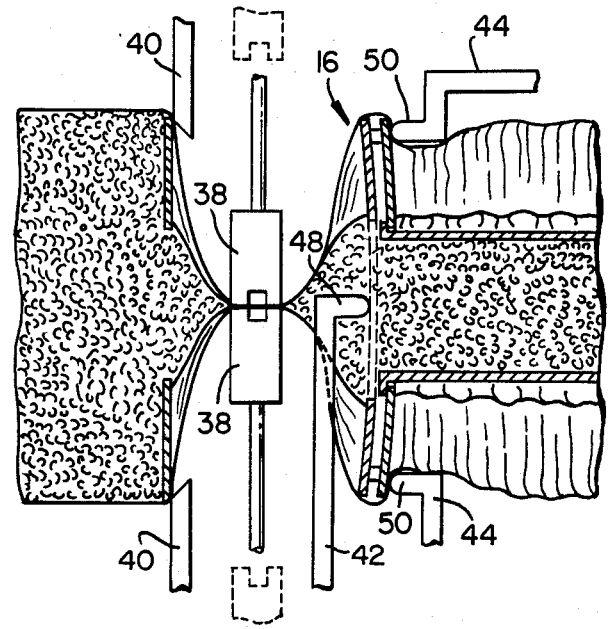
Figure 7:
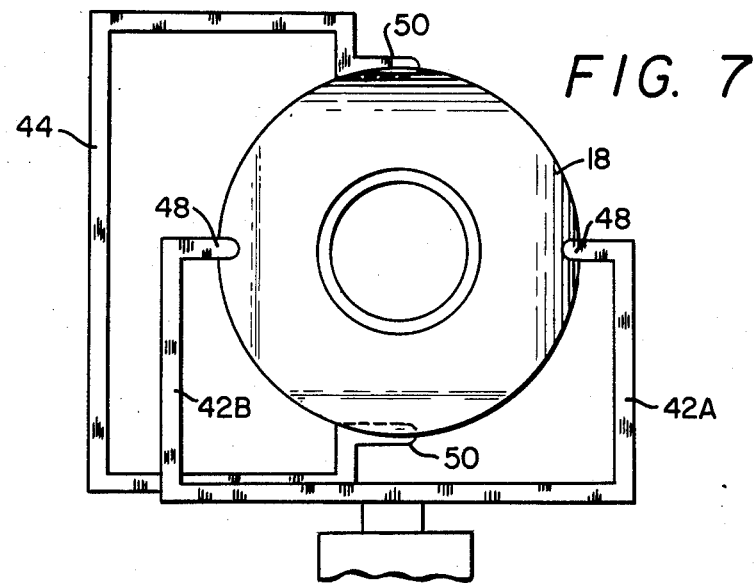
FIG. 7 is a view taken generally along lines 7—7 of FIG. 2 with the casing omitted for clarity.

As the disc pair 16A is being moved towards the preset stuffing position, the stop block 42 is moved upward to its block position (FIG. 6). The cooperation between the positioning means 44 and the stop block 42 first straightens the pair of discs and orients them in a plane which is substantially perpendicular to the stuffing axis, and then bends the discs with respect to this plane as set out hereinabove.

The clip and sever sequences are initiated (preferably after stop block 42 and the escorting and positioning means 44 are retracted) by moving the clipper and severing means 38 inwardly from the dotted line position to the solid line position shown in FIG. 6. This gathers the casing and then closes the casing by applying two metal clips. The casing is then severed between the clips. The clipper 38 and split emulsion ring 40 then open to restore substantially the condition shown in FIG. 2.

Thus, the invention as described provides a stuffing machine which has a means for insuring the separation of the joined disc pair, and for avoiding the problems caused by the disc not separating properly during the stuffing operation.

Having described the invention in detail, what is claimed as new is:

1. A stuffing apparatus having a stuffing axis along which is arranged a stuffing tube for stuffing a food product under pressure into casing drawn from a supply coaxially disposed about the tube, said apparatus comprising:
    (a) positioning means for engaging and moving in a forward direction along said stuffing tube to a preset position proximate the discharge end thereof, a pair of annular discs which are disposed coaxially on said stuffing tube and are arranged face to face within the casing, and which have connector means releasably joining them with their adjacent inwardly facing surfaces in close proximity, the releasably joined pair of discs including a leading disc and a trailing disc which follows the leading disc in the direction of movement, and upon reaching said preset position, said leading and trailing discs being situated with respect to said discharge end such that stuffing will cause a pressure build up between said discs;
    (b) retractable pressing means operable prior to stuffing to press against the joined discs with sufficient force to distort said discs and thereafter to retract from said discs, said discs being sufficiently distortable by said pressing means to weaken the connector means for separation of said discs responsive to a build up of pressure between them; and
    (c) means for holding said trailing disc at said preset position while leaving said leading disc free to move forward and longitudinally away from said discharge end responsive to the stuffing of a food product under pressure into the casing.

2. Stuffing apparatus as in claim 1 wherein said retractable pressing means includes members pressable inward against the outboard facing surface of each disc.

3. Stuffing apparatus as in claim 1 wherein said connector means cooperate in a plane between said discs to provide said releasable connection and said retractable pressing means is pressable against said discs to warp said discs with respect to said plane.

4. Stuffing apparatus as in claim 3 wherein said retractable pressing means is pressable against the outboard facing surface of each disc and comprises:
 (a) a stop member positionable against the outboard facing surface of one of said discs;
 (b) a pressing member positionable against the outboard facing surface of the other of said discs; and
 (c) means moving one of said members with respect to the other and perpendicular to the plane of said discs for pressing said members inwardly against said joined pair of discs and thereby warping said discs with respect to the plane of the connection therebetween.

5. Stuffing apparatus as in claim 4 wherein said member positionable against said leading disc is displaceable in a plane perpendicular to said stuffing axis for selective movement into and out of the leading disc path of travel along said stuffing axis.

6. Stuffing apparatus as in claim 4 wherein each of said members is disposed to press inward on said joined pair at two diametrically spaced peripheral locations, the pressing locations of one of said members being removed by 90° from the pressing locations of the other of said members.

7. Stuffing apparatus as in claim 4 wherein said stop member is movable in a plane perpendicular to said stuffing axis in front of said leading disc and said pressing member is movable along a path parallel to said stuffing axis for engagement against said trailing disc.

8. Stuffing apparatus as in claim 7 wherein said stop member is mounted on a slide and wherein drive means attached to said slide moves said stop member transverse to said stuffing axis into position in front of said leading disc.

9. Stuffing apparatus as in claim 8 wherein said slide and drive means are mounted on a carriage which is movable parallel to said stuffing axis.

10. A stuffing method for producing encased products having substantially flat ends comprising the steps of:
 (a) providing leading and trailing annular discs arranged face to face with their adjacent inwardly facing surfaces in close proximity and releasably connected, and coaxially disposing said discs on a stuffing tube and within a casing supply also coaxially disposed on the stuffing tube.
 (b) moving said annular discs forwardly along and positioning said discs at a preset location proximate said stuffing tube discharge end;
 (c) while said joined discs are at said preset location, applying a pressing force against them and warping at least one of said discs relative to the plane of the connection between said discs, thereby weakening the connection for subsequent separation of the discs, and then removing said pressing force;
 (d) stuffing a food product under pressure into casing drawn forwardly from said casing supply; and during step (d)
 (e) holding said trailing disc at said preset location and leaving said leading disc free to separate from said trailing disc while passing said casing coaxially over said trailing disc, and separating said leading disc from said trailing disc and moving said leading disc longitudinally away from said stuffing tube discharge end responsive to said food product entering and stuffing said casing.

11. A stuffing method as in claim 10 wherein said warping at step (c) is accomplished by pressing against the outboard surfaces of each disc in a direction substantially perpendicular to the plane of the connection between.

12. A stuffing method as in claim 11 wherein said step of pressing against each outboard surface occurs at two diametrically spaced positions, the spaced pressing locations with respect to one of said discs being displaced by 90° from the spaced pressing locations with respect to the other of said discs.

13. A stuffing method as in claim 11 wherein said warping at step (c) causes said discs to separate.

14. A stuffing method as in claim 11 wherein said warping at step (c) weakens said connector means sufficiently to permit subsequent separation of said discs responsive to a stuffing pressure at step (d).

15. A stuffing method as in claim 12 wherein said spaced pressing locations are adjacent the outer periphery of said discs.

* * * * *